US009497184B2

(12) United States Patent
Fork et al.

(10) Patent No.: US 9,497,184 B2
(45) Date of Patent: Nov. 15, 2016

(54) USER IMPERSONATION/DELEGATION IN A TOKEN-BASED AUTHENTICATION SYSTEM

(75) Inventors: Michael John Fork, Gibsonburg, OH (US); Vincent Edmund Price, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 1105 days.

(21) Appl. No.: 13/072,884

(22) Filed: Mar. 28, 2011

(65) Prior Publication Data

US 2012/0254957 A1 Oct. 4, 2012

(51) Int. Cl.
G06F 7/04 (2006.01)
G06F 15/16 (2006.01)
G06F 17/30 (2006.01)
H04L 29/06 (2006.01)
G06F 21/33 (2013.01)
H04L 9/32 (2006.01)

(52) U.S. Cl.
CPC ........... *H04L 63/0807* (2013.01); *G06F 21/33* (2013.01); *H04L 9/3213* (2013.01); *H04L 9/3234* (2013.01); *G06F 2221/2115* (2013.01); *H04L 63/0884* (2013.01)

(58) Field of Classification Search
USPC .................. 726/6, 2–5, 7–10; 713/155–159, 713/168–181
See application file for complete search history.

(56) References Cited

U.S. PATENT DOCUMENTS

| 6,198,824 | B1* | 3/2001 | Shambroom ................. 380/279 |
| 6,363,365 | B1* | 3/2002 | Kou .............................. 705/64 |
| 7,797,544 | B2* | 9/2010 | Dillaway et al. ............ 713/179 |
| 2004/0260942 | A1 | 12/2004 | Jamieson et al. |
| 2005/0044377 | A1 | 2/2005 | Huang et al. |
| 2006/0075253 | A1* | 4/2006 | Sonkin et al. ................ 713/183 |
| 2006/0225132 | A1* | 10/2006 | Swift et al. ..................... 726/11 |
| 2006/0294192 | A1* | 12/2006 | Mao et al. ..................... 709/213 |
| 2007/0107048 | A1* | 5/2007 | Halls et al. ......................... 726/4 |
| 2008/0016232 | A1* | 1/2008 | Yared et al. .................. 709/229 |
| 2008/0086770 | A1 | 4/2008 | Kulkarni et al. |
| 2009/0117883 | A1 | 5/2009 | Coffing et al. |
| 2009/0217366 | A1 | 8/2009 | Gao et al. |
| 2009/0235349 | A1 | 9/2009 | Lai et al. |
| 2009/0307744 | A1* | 12/2009 | Nanda et al. ...................... 726/1 |
| 2010/0083359 | A1 | 4/2010 | Readshaw et al. |
| 2010/0132019 | A1 | 5/2010 | Hardt |
| 2011/0307947 | A1* | 12/2011 | Kariv et al. ........................ 726/9 |

OTHER PUBLICATIONS

Internet Engineering Task Force (IETF) E. Hammer-Lahav, Ed. Request for Comments: 5849 Apr. 2010 Category: Informational ISSN: 2070-1721 The OAuth 1.0 Protocol.*
OAuth 2.0 support for the Kerberos V5 Authentication Protocol T. Hardjono, Ed. MIT Kerberos Consortium Jun. 9, 2010.*
Search Report, UK Patent Office, GB1204639.7, dated Jul. 31, 2012.

* cited by examiner

*Primary Examiner* — Christopher Revak
*Assistant Examiner* — Vadim Savenkov
(74) *Attorney, Agent, or Firm* — David B. Woycechowsky; David H. Judson

(57) ABSTRACT

A "trusted service" establishes a trust relationship with an identity provider and interacts with the identity provider over a trusted connection. The trusted service acquires a token from the identity provider for a given user (or set of users) without having to present the user's credentials. The trusted service then uses this token (e.g., directly, by invoking an API, by acquiring another token, or the like) to access and obtain a cloud service on a user's behalf even in the user's absence. This approach enables background services to perform operations within a hosted session (e.g., via OAuth-based APIs) without presenting user credentials or even having the user present.

24 Claims, 4 Drawing Sheets

USER IMPERSONATION/DELEGATION IN A TOKEN-BASED AUTHENTICATION SYSTEM

BACKGROUND OF THE INVENTION

1. Technical Field

This disclosure relates generally to techniques to enable non-interactive-based integration among applications sharing a common, token-based authentication system without a user necessarily being present.

2. Background of the Related Art

In a traditional client-server authentication model, a client uses its credentials to access resources hosted by a server. With the increasing use of distributed web services and cloud computing, third-party applications often require access to these server-hosted resources. OAuth is an open protocol (Internet Request for Comment (RFC) 5849) that enables users to share their private data among different Web sites along with their credentials while only exposing the data on the original Web site where it is held. In particular, the OAuth protocol allows users to share private resources stored on one Web site with other sites without exposing the users' credentials—for example, usernames and passwords—to Web sites other than the one holding the users' data. A Web site adopting OAuth as one of its authentication protocols enhances the privacy and security for users. To accomplish this functionality, OAuth introduces to the traditional client-server authentication model a third role, a resource owner. In the OAuth model, the client (which is not the resource owner, but is acting on its behalf) requests access to resources controlled by the resource owner but hosted by the server. In addition, OAuth allows the server to verify not only the resource owner authorization, but also the identity of the client making the request.

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

While the above-described solution provides many advantages, it has not been possible to integrate on-premises non-interactive services with cloud-based authentication systems that expect the end user to be present. Thus, for example, suppose a cloud customer operates on-premises a customer relationship management (CRM) application and a first user takes an action therein (e.g., identifying a new sales opportunity); that action might normally be expected to generate some desired outcome in the cloud service, such as causing a new "to do" activity to be created in the service for a second user—but only if the second user's credentials are available upon invocation. If the cloud service uses a scheme that requires an invoker to present the user's credentials (or, as in OAuth, requires an authorized token to invoke requests), this task cannot be implemented in an automated manner. While it is possible to address this requirement by storing all user credentials for the cloud service, this is insecure and undesirable.

Thus, there remains a need to provide a technique by which a trusted service can access a hosted service on behalf of a user in the user's absence. This disclosure addresses this need.

BRIEF SUMMARY

A "trusted service" establishes a trust relationship with an identity provider and interacts with the identity provider over a trusted connection. Because the trusted service is "trusted", it can acquire a token from the identity provider for a given user (or set of users) without having to present the user's credentials. The trusted service then uses this token (e.g., directly, by invoking an API, by acquiring another token, or the like) to access and obtain a hosted service (e.g., a cloud-based service) on a user's behalf—even in the user's absence. This approach enables non-interactive (e.g., background) services to perform operations within a hosted service (e.g., via OAuth-based APIs) without presenting user credentials or even having the user present.

A method for user impersonation by a trusted service begins by establishing a trust relationship between a service and an identity provider, by which the service becomes a "trusted service." The trusted service then requests a token from the identity provider. The token is then received from the identity provider. In one embodiment, the trusted service, acting on the user's behalf, then requests a session from an application (e.g., a cloud service) by making a request that includes the token. In an alternative embodiment, the trusted service directly invokes an API with the token to obtain the service, or it may use the token to obtain another token in order to do so. Upon a successful authentication (e.g., by an associated service provider), the trusted service receives authenticated session information (e.g., a second token), which information indicates that it, the trusted service, is an authenticated user. The trusted service then performs one or more operations in the session as an authenticated user.

In an alternative embodiment, the above-described method is performed in an apparatus comprising a processor, and computer memory holding computer program instructions that when executed by the processor perform the method.

In another alternative embodiment, the above-described method is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
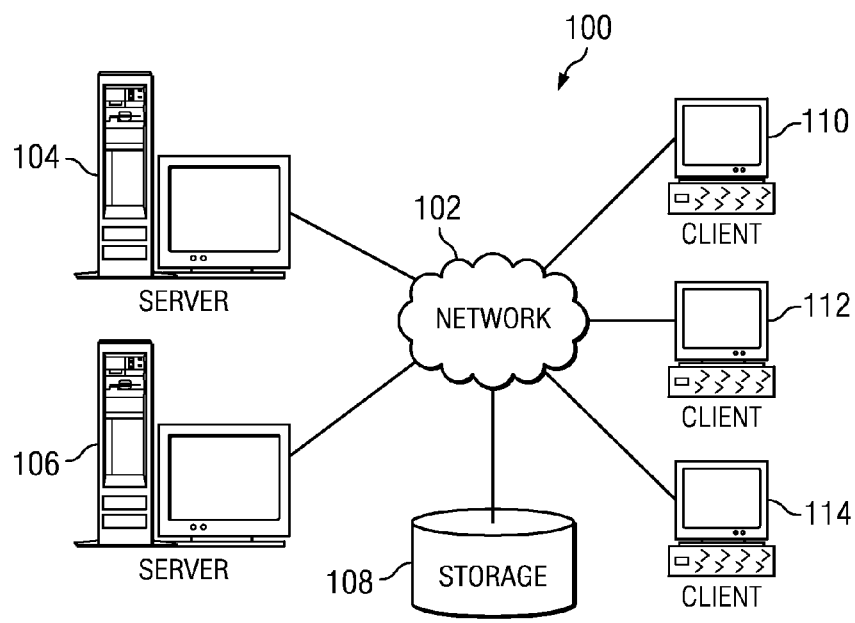
FIG. 1 depicts an exemplary block diagram of a distributed data processing environment in which exemplary aspects of the illustrative embodiments may be implemented.
Figure 2:
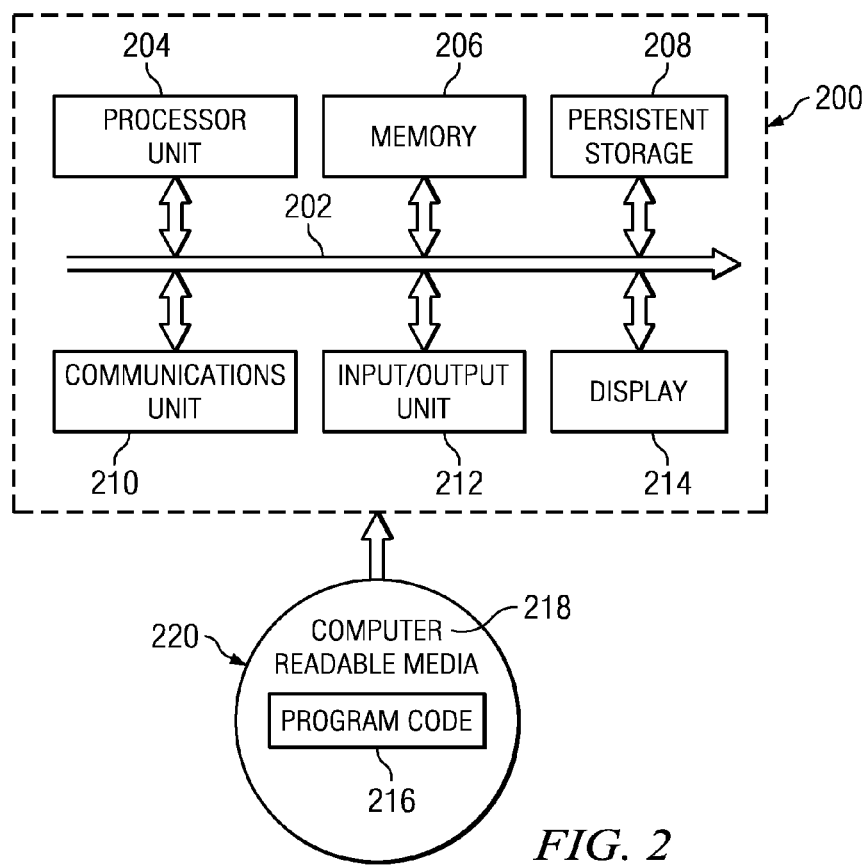
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Network Model With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
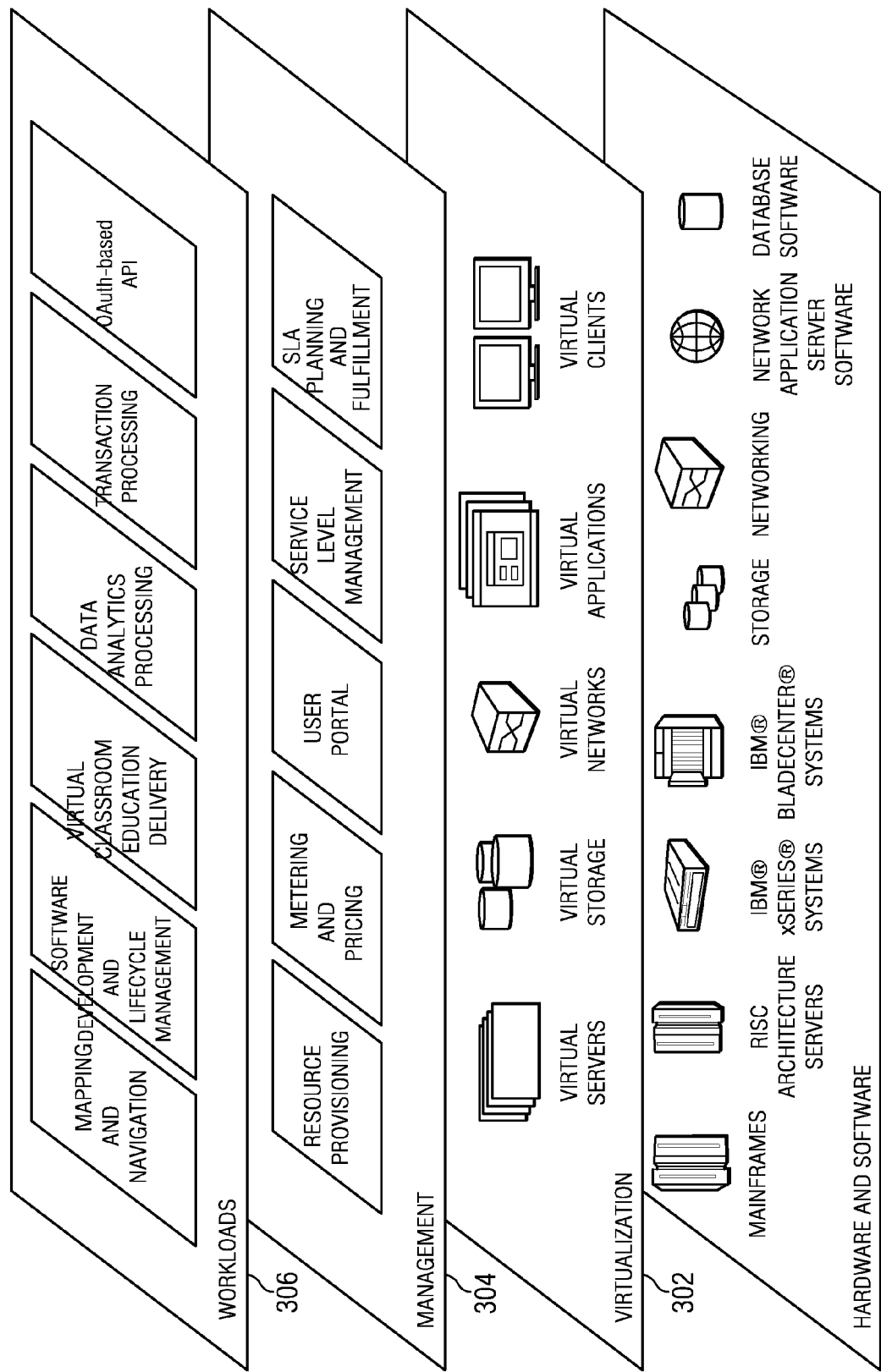
FIG. 3 depicts abstraction model layers of a cloud compute environment (a service provider)

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and OAuth-based API integration (for the purposes to be described below).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

A representative cloud-based client-server application is IBM® LotusLive, which provides a cloud-delivered suite of technologies that combine web conferencing, messaging, and collaboration services with social networking capabilities in an easy-to-use web-based environment.

Of course, the references herein to LotusLive are merely for the sake of illustration, and they are not intended to limit the scope of this disclosure.

Authentication Mechanisms

Security Assertion Markup Language (SAML) is an XML-based standard for exchanging authentication and authorization data between security domains, that is, between an identity provider (a producer of assertions) and a service provider (a consumer of assertions). SAML is a development of the OASIS Security Services Technical Committee. SAML implements the concepts of Identity Providers (source of assertions), and Service Providers (consumers of assertions). The Service Provider (SP) trusts the Identity Provider (IdP) to authenticate the principal. SAML assumes the principal (often a user) has enrolled with at least one identity provider. This identity provider is expected to provide local authentication services to the principal. SAML, however, does not specify the implementation of these local services; indeed, SAML does not care how local authentication services are implemented (although individual service providers do). Thus, a service provider relies on the identity provider to identify the principal. At the principal's request, the identity provider passes a SAML assertion to the service provider. On the basis of this assertion, the service provider makes an access control decision. To facilitate SAML, a trusted partnership must be set up that comprises IdPs and SPs exchanging metadata about each other's SAML implementation, including keys to encrypt/decrypt the SAML assertions.

OAuth (Open Authorization) is an open standard that allows users to share their private resources (e.g. photos, videos, contact lists) stored on one site with another site without having to hand out their username and password. OAuth allows users to hand out tokens instead of usernames and passwords to their data hosted by a given service provider. A token grants an entity access to a specific site (e.g. a video editing site) for specific resources (e.g. just videos from a specific album), and for a defined duration (e.g. the next 2 hours). Thus, OAuth allows a user to grant a third party site access to their information stored with another service provider, without sharing their access permissions or the full extent of their data.

OAuth requires the invoker to have a token (that has been approved by a user at a targeted service provider) to be included in a request. Obtaining that approval often requires the user to be present to authenticate to the targeted service provider.

OAuth also is useful in cloud environments. For example, LotusLive secures its application programming interface (API) functions using OAuth.

User Impersonation/Delegation in a Cloud-Supported Token-Based Authentication System With the above as background, this disclosure provides a technique by which a trusted service "impersonates" a user to a cloud service and thus can perform operations even in the user's absence.

It is assumed that, among the services provided by the cloud service, one of these is a "service provider" that consumes an authentication system, such as a token-based authentication, namely, by reaching back to an identity provider with a token to have it validated. A representative scheme, as described above, is SAML, although the techniques are not limited to service providers that implement SAML-based authentication. Other token-based authentication schemes include, without limitation, OpenID. A SAML-based service provider, such as operative within LotusLive in the above-described example, may implement OAuth-based API invocation.

An identity provider (IdP) interacts with the service provider is a known manner. Generalizing, according to the OASIS standard definition, an identity provider is a kind of service provider that creates, maintains, and manages identity information for principals and provides principal authentication to other service providers within a federation. Its primary function is principal authentication. As noted above, at a principal's request, the identity provider may pass a SAML assertion to the service provider. On the basis of this assertion, the service provider makes an access control decision.

Figure 4:
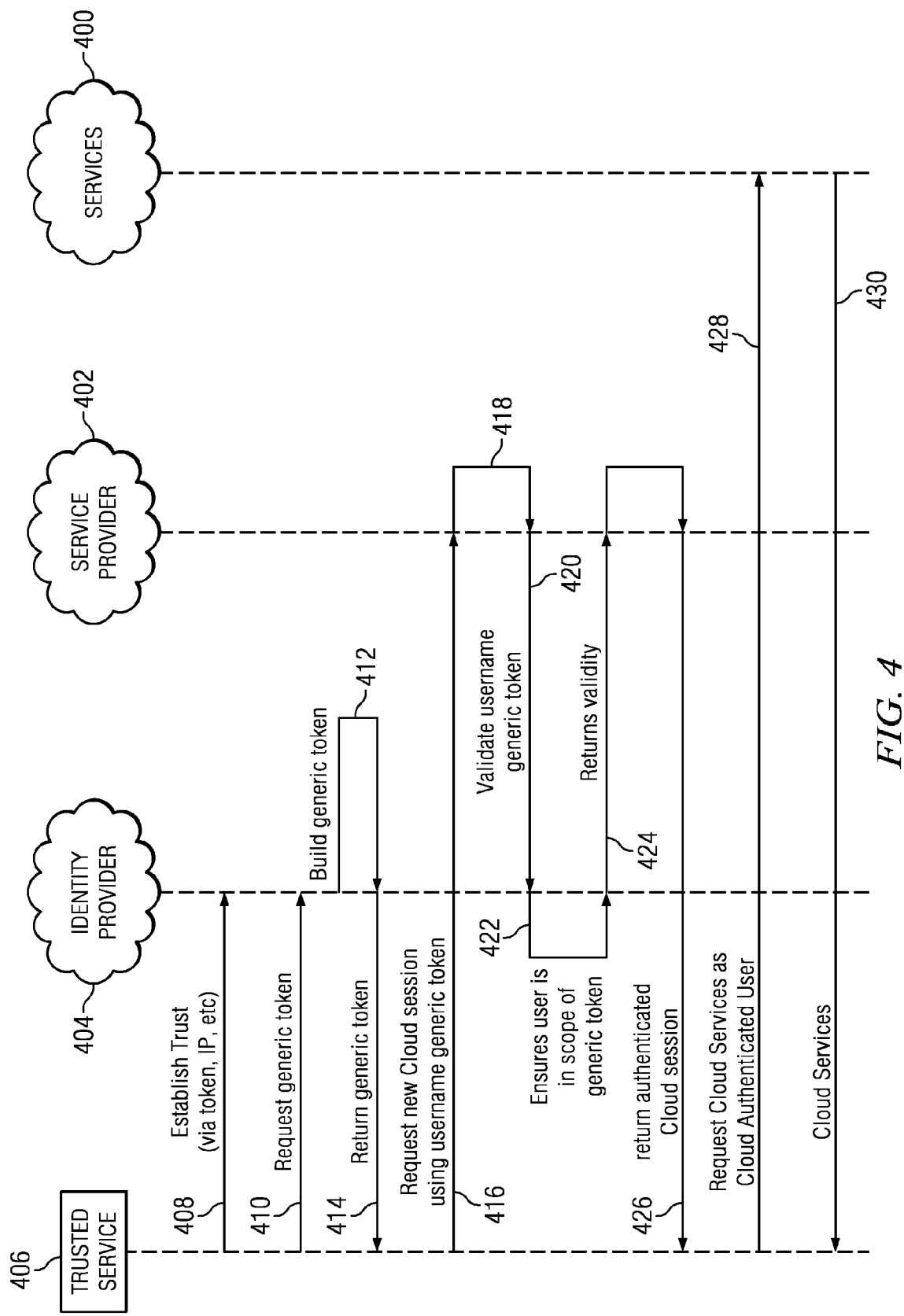
FIG. 4 depicts a first example embodiment according to this disclosure by which a trusted service acquires a token from an identity provider for specific set of users, which token is then useful to enable the trusted service to access a service provider on a permitted user's behalf, even in the user's absence.

Referring now to FIG. 4, a first embodiment of the inventive technique is illustrated. In this embodiment, the cloud services 400 represent one or more cloud-based applications that are accessible by a cloud customer, typically an enterprise, and in particular a user or group of users associated with the enterprise. In this embodiment, a service provider 402 consumes a token-based authentication system. An identity provider 404, which may be a component of the cloud service or distinct therefrom, validates users and issues tokens to present to the service provider 402. An identity provider 404 may be implemented using a computing machine executing a server process, such as a SAML server. The service provider 402 takes tokens that are presented to it and sends them to the identity provider for validation. The identity provider 404 also functions to check the validity of any token presented by any service provider to which it is associated. As noted above, SAML-based authentication is enabled by setting up a trusted partnership between the identity provider 404 and the service provider 402 and the exchange of metadata about each other's SAML implementation, including keys to encrypt/decrypt the SAML assertions. In the context of FIG. 4, it is assumed that a trusted relationship has been established between the service provider 402 and the identity provider 404.

According to this disclosure, a "trusted service" 406 impersonates a user (or a group of users) to the other entities (namely, the identity provider, the service provider, and the cloud service of interest). A "trusted service" is, in general, a computing entity (a machine-based system, program, process, execution thread, or the like) that has the capability of establishing a trust relationship with the identity provider 404 and interacting with the identity provider over a trusted connection. When a "trusted service" is associated with and connects to the identity provider in this manner, the identity provider does not need to check for user credentials, but rather just creates the requested token representing the user (or group of users) and returns it. In particular, the identity provider validates that credentials requested by the trusted service fall within the identity provider's allowable domain (which may be some subset of a larger set of users known to the identity provider). The "impersonation" (provided by the trusted service) is sometimes referred to herein as "delegation" because, according to the technique, a user, or a group of users (or, more generally, an IdP administrator or other permitted entity, with or without user awareness) in effect delegates to the trusted service the ability to interact with the other entities on behalf of the user, or the group or users. Advantageously, the trusted service 406 acquires a token (or, more generally, a data string that is unique) from the identity provider 404 for a given user (or set of users) without having to present the user's credentials. As will be seen, this allows the trusted service 406 to access the cloud service 400 on a user's behalf even in the user's absence.

FIG. 4 depicts the first embodiment according to this disclosure by which the trusted service 406 acquires a token from the identity provider 404 for specific set of users, which token is then useful to enable the trusted service 406 to access the service provider 402 on a permitted user's behalf, even in the user's absence. The technique begins at step 408 with the trusted service 406 establishing trust with the identity provider 404 using conventional techniques (e.g., via a pre-shared token or key, by making a request from a particular IP address, or the like). Step 408 may also include mutual exchange and authentication of SSL certificates, SSH key-based authentication, and the like. In this example, trusted service 406 is associated with (or a component of) an on-premises application, such as a customer relationship management (CRM) application. Trusted service, in the alternative, may be a standalone service, a cloud-based service, or the like. Generalizing, the service (that is the "trusted service") is a process/service/application that has access to the data to be integrated. At step 410, the trusted service 406 connects to the identity provider 404 over a connection that is trusted by the IdP and requests a generic token. This connection may be a secure connection (e.g., a link secured by SSL, TLS, or the like), or even a non-secure connection (provided in either case it is still trusted by the IdP). A connection trusted by the identity provider is sometimes referred to herein as a "trusted connection." As noted above, because the trusted service is trusted and connects over a trusted connection, the identity provider need not check user credentials before responding to the request for the generic token. Although the identity provider need not check such user credentials, optionally it may check that the user requested by the trusted service is within the set of users allowed to use the trusted service. In this particular embodiment, the token is said to be "generic" because it is scoped to a specific set of users (e.g., any person in the "sales" group) or, alternatively, "all" users. Any token that is scoped to other than a particular user may be considered "generic". The generic token also may be based on one or more other attributes, such as time, location, responsibility (role) or the like. Thus, a generic token may be requested for "employees from Rochester sales" or the like.

The following provides additional details regarding how a generic token may be scoped. In one approach, a set of target users is identified. There may be several criteria used or evaluated for this purpose. Thus, for example, a set of target users may be an existing group of users in a user data store (e.g., an LDAP Group), a set of user with a specific attribute value (e.g., user state="OH" status='EMPLOYED' title='SALES'), those users assigned a specific role in a source application, those users assigned a specific role at the target application, and so forth. The target users selected then can be defined by one or more configurable rules or policies. For example, the rule/policy may be defined at the trusted connection level, e.g., for a given trusted connection, the generic token is always generated for a given set of target users. The rule/policy may be defined at the trusted connection level with further configurability being available to the trusted service, e.g., for a particular trusted connection, always generate tokens for a trusted-service configured subset of a set of target users. A rule/policy could also be defined by trusted connection attributes, e.g., any connection over a secure link sets a generic token for a first set of defined target users, any connection over a non-secure link sets a generic token for a second set of defined target users, and so forth. A rule/policy may be defined to have global effect, e.g., any and all trusted connections use an identified set of target users, and so forth. In addition, user participation in the configuration of a given rule/policy may be enforced/permitted, as controlled by an administrator associated with the trusted service. The trusted service may also enforce an explicit opt-in by user policy, an explicit opt-out by user policy, or the like. The above are merely exemplary.

Returning back to FIG. 4, at step 412, the identity provider 404 builds the generic token requested and, at step 414, returns the generic token to the trusted service 406. This token generation process may take place in an off-line manner, or at the time when it is desired to initiate a "session" (or transaction) with the cloud service (in this example scenario). In other words, the token generation may take place asynchronously or synchronously. In either event, and because the request is from the trusted service and over a trusted connection, the SAML server does not need to check for user credentials (although, as noted above, optionally the server may check that the group falls within the domain allowed to use the trusted service), but rather the SAML server creates the token representing group of users and returns it.

At step 416, the trusted service requests a new session, e.g., by adding the generic token to an OAuth API request as the authentication method, and making a call to the cloud service. In an embodiment in which LotusLive is the cloud service, the session is requested in step 416 by using the generic token to authenticate via SAML and obtain an OAuth token (for the specific user authenticated to LotusLive) that is then used on API calls. In step 416, the request also includes the username (or other user-specific identifier) for the user to be impersonated by the trusted service. This request is sent by the trusted service 406 to the service provider 402, which must validate the request before allowing the session to be initiated. At step 418, the service provider 402 extracts the token and username from the request. At step 420, the service provider 402 sends the token and username to the identity provider 404 for validation. At step 422, the identity provider 404 checks to determine that the presented user is in the set of users the token was scoped to (i.e. that the user is in scope of the generic token). If the outcome of the check is positive (i.e. if the username is in the generic token's authentication domain), the identity provider 404 returns a response to the service provider 402 that indicates that the {token+username} is valid. This is step 424. Thereafter, the service provider interacts with the "requester" (the trusted service) in a conventional manner. In particular, at step 426, the service provider 402 returns session identifier information (e.g., another token, the generic token itself, or similar data) indicating that a session (with the cloud service in this example) is permitted. Continuing with the above example (an OAuth API request), the trusted service 406 then requests a service (e.g., makes an API request) as an authenticated user, namely, the as the user authenticated in step 424. This is step 428. The API request is then processed by the cloud service 400, as indicated by step 430, to complete the process.

Figure 5:
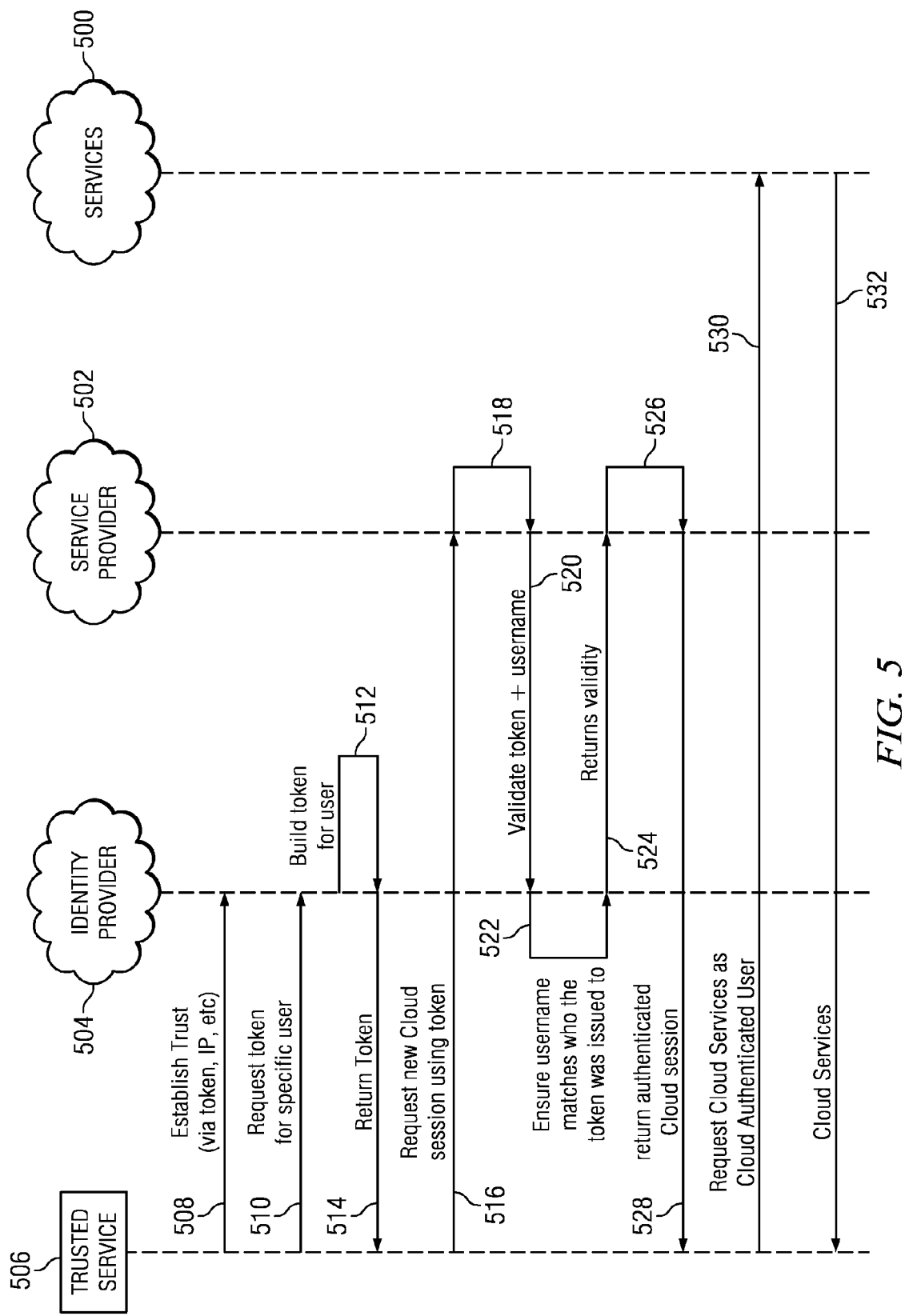
FIG. 5 illustrates a second example embodiment according to this disclosure by which the trusted service acquires a token from an identity provider for specific user, which token is then useful to enable the trusted service to access a service provider on that user's behalf, even in the user's absence

FIG. 5 illustrates an alternative embodiment according to this disclosure by which the trusted service acquires a token from an identity provider for a specific user, which token is then useful to enable the trusted service to access a service provider on that user's behalf, even in the user's absence. The operations are similar to those described above with respect to FIG. 4.

The technique begins at step 508 with the service 506 establishing trust with the identity provider 504 and becoming a trusted service, as has been described. At step 510, the trusted service 506 connects to the identity provider 504 over a trusted connection and, in this embodiment, requests a token for a specific user. As noted above, because the trusted service is trusted and connects over a trusted connection, the identity provider need not check user credentials before responding to the request for the specific token (although, optionally, it may check that the user is within the set of users allowed to use the trusted service). At step 512, the identity provider 504 builds the specific token requested (without the need to check for user credentials) and, at step 514, returns the token to the trusted service 506. As with the first embodiment, the token generation may take place asynchronously or synchronously.

At step 516, the trusted service requests a new session, e.g., by adding the user-specific token to an OAuth API request as the authentication method, by authenticating via SAML to acquire an OAuth token, or the like, and then making a call to the cloud service. A username is sent with this request as well, as in the previous embodiment. This request is sent by the trusted service 506 to the service provider 502, which as noted above must validate the request before allowing the session to be initiated. At step 518, the service provider 502 extracts the token from the request. At step 520, the service provider 502 sends the token+username to the identity provider 504 for "validation." At step 522, the identity provider 504 checks to ensure that the username matches who the token was issued to. The identity provider 504 then returns an affirmative to the service provider 502 that includes the username associated with the user. This is step 524. At step 526, the service provider 502 checks for the affirmative response (if the response is not affirmative, the process may be terminated, the user is correct an opportunity to create the problem, or the like). The service provider 502 then returns session identifier information (e.g., another token, the user-specific token, or similar data) indicating that a session (with the cloud service in this example) is permitted. This is step 528. Continuing with the above example (an OAuth API request), the trusted service 506 then requests a service (e.g., makes an API request) as an authenticated user. This is step 530. The API request is then processed by the cloud service 500, as indicated by step 532, to complete the process.

The "request" made by the trusted service (406, in FIG. 4, or 506, in FIG. 5), may be of any type. As noted in the above examples, a preferred type of request is an OAuth-based request, and, more particularly, an OAuth-based API request. In this manner, any service that uses OAuth-based APIs thus can access and obtain services on behalf of absent users. More generally, one of ordinary skill will appreciate that the technique advantageously enables integration of any non-interactive service (e.g., any background service) with any authentication system (including, without limitation, any token-based authentication mechanism) that expects (or requires) the user to be present.

The service provider-identity provider interactions described above are merely exemplary, and they are not intended to limit the scope of the disclosed technique, as any convenient token-based interaction is contemplated.

Preferably, the described technique is implemented by providing an identity provider that has been modified to interact with a trusted service in the manner described. The scheme does not require any changes to the service provider.

The techniques herein provide significant advantages. This disclosure advantageously describes a method for a trusted service to acquire a token from an identity provider for a given user or a group of users without having to present the user's credentials. This allows the trusted service to then access a cloud service on the user's behalf even if the user is absent. Preferably, the technique is implemented in association with an identity provider, which is under the control of a user, an administrator, or an entity associated with the user, and the approach does not require any changes to the service provider. The solution enables non-interactive services to be integrated with authentication and authorization systems that expect a user to be present. As described, the approach enables such a service to carry out operations (e.g., synchronize data off-hours) and in the background when users are not available.

Additional advantages are that the user to be impersonated at the service provider does not have to submit credentials (to the service provider), does not have to be present for the transaction, does not have to authorize the transaction, and/or does not even need to be aware of the transaction.

As used herein, and in a preferred embodiment, the "generic" token (FIG. 4) or "user-specific" token (FIG. 5) may comprise a component of a SAML assertion.

In a representative, but non-limiting, implementation, a representative cloud service is LotusLive, and the identity provider (IdP) is implemented in Tivoli Federated Identity Manager (TFIM). These products and services are available from IBM Corporation, of Armonk, N.Y.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

The techniques herein are not limited to use with a cloud service. The above-described technique also may be implemented to enable user impersonation by a trusted service to other services, e.g., a web application, an operating system application programming interface (API) call, or the like More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, and as noted above, the identity provider and the described "impersonation" function is implemented in software, which includes but is not limited to firmware, resident software, microcode, and the like. The "token" may be any generic data string or structure that can be transported over a link and/or stored in a data store, such as computer memory.

Furthermore, the user impersonation/delegation functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the identity provider components are implemented in a special purpose computer, preferably in software executed by one or more processors. The software also is maintained in one or more data stores or memories associated with the one or more processors, and the software may be implemented as one or more computer programs.

The user impersonation/delegation function may be implemented as an adjunct or extension to an existing security (authentication) service, or access manager solution. The technique also may be implemented in an automated manner, as has been described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application. Further, while typically the client-server interactions occur using HTTP, this is not a limitation either. The client server interaction may be formatted to conform to the Simple Object Access Protocol (SOAP) and travel over HTTP (over the public Internet), FTP, REST, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Having described our invention, what we now claim is as follows:

1. A method, operating within a service, of enabling access by the service to an application executing in a computing entity, comprising:
    establishing, by the service, a trust relationship between the service and an identity provider by which the service becomes a trusted service;
    requesting, by the trusted service, a token from the identity provider;
    receiving, by the trusted service, the token from the identity provider, the token having been generated by the identity provider without requiring presentation by the trusted service of user credential information;
    the trusted service, on behalf of a user, using the token and a user credential to establish the trusted service as an authenticated user to the application; and
    upon establishing the trusted service as an authenticated user, the trusted service accessing the application.

2. The method as described in claim 1 wherein the token is used to establish the trusted service as an authenticated user by the trusted service forwarding the token to a service provider associated with the identity provider and, upon a validation, the trusted service receiving authentication session information, the authentication session information indicating that the trusted service is an authenticated user for a session.

3. The method as described in claim 2 wherein the token received by the trusted service is a generic token for a set of authorized users.

4. The method as described in claim 3 wherein the validation checks to determine that the user credential is associated with the generic token.

5. The method as described in claim 2 wherein the token received by the trusted service is a specific token for an authorized user.

6. The method as described in claim 5 wherein the validation identifies a username associated with the specific token and verifies that the username matches the user credential.

7. The method as described in claim 2 wherein the validation is performed at least in part by the identity provider.

8. The method as described in claim 1 wherein the computing entity is a shared pool of configurable computing resources.

9. The method as described in claim 1 wherein the trusted service accesses the application using an OAuth-based application programming interface (API).

10. The method as described in claim 1 wherein the service is associated with an on-premises application and the application executing in the computing entity is a cloud-based service.

11. The method as described in claim 1 wherein, for a particular trusted connection between the trusted service and the identity provider, the token represents a trusted service-configured subset of a set of target users.

12. The method as described in claim 1 further including scoping the token as a function of one or more of a set of attributes, the attributes being one of: time, location, status and role.

13. Apparatus, comprising:
    a processor;
    computer memory holding computer program instructions that when executed by the processor perform a method, operating within a service, of enabling access by the service to an application executing in a computing entity, the method comprising:
        establishing, by the service, a trust relationship between the service and an identity provider by which the service becomes a trusted service;
        requesting, by the trusted service, a token from the identity provider;
        receiving, by the trusted service, the token from the identity provider, the token having been generated by the identity provider without requiring presentation by the trusted service of user credential information;
        the trusted service, on behalf of a user, using the token and a user credential to obtain an authenticated user identity for the trusted service and by which the user can be impersonated to the application; and
        upon receiving the authenticated user identity establishing the trusted service as an authenticated user, the trusted service accessing the application.

14. The apparatus as described in claim 13 wherein the token is used by the trusted service forwarding the token to a service provider associated with the identity provider and, upon a validation, the trusted service receiving the authenticated user identity.

15. The apparatus as described in claim 14 wherein the token received by the trusted service is a generic token for a set of authorized users.

16. The apparatus as described in claim 15 wherein the validation checks to determine that the user credential is associated with the generic token.

17. The apparatus as described in claim 14 wherein the token received by the trusted service is a specific token for an authorized user.

18. The apparatus as described in claim 17 wherein the validation identifies a username associated with the specific token and verifies that the username matches the user credential.

19. A computer program product in a non-transitory computer readable medium for use in a data processing system, the computer program product holding computer program instructions which, when executed by the data processing system, perform a method, operating within a service, of enabling access by the service to an application executing in a computing entity, the method comprising:
    establishing, by the service, a trust relationship with an identity provider by which the service becomes a trusted service;
    requesting, by the trusted service, a token from the identity provider;
    receiving, by the trusted service, the token from the identity provider, the token having been generated by the identity provider;
    receiving, by the trusted service, the token from the identity provider, the token having been generated by the identity provider without presentation by the trusted service of user credential information;

the trusted service, on behalf of a user, using the token and a user credential to obtain an authenticated user identity for the trusted service and by which the user can be impersonated to the application; and upon receiving the authenticated user identity establishing the trusted service as an authenticated user, the trusted service accessing the application.

20. The computer program product as described in claim 19 wherein the token is used by the trusted service forwarding the token to a service provider associated with the identity provider and, upon a validation, the trusted service receiving the authenticated user identity.

21. The computer program product as described in claim 20 wherein the token received by the trusted service is a generic token for a set of authorized users.

22. The computer program product as described in claim 21 wherein the validation checks to determine that the user credential is associated with the generic token.

23. The computer program product as described in 20 wherein the token received by the trusted service is a specific token for an authorized user.

24. The computer program product as described in claim 23 wherein the validation identifies a username associated with the specific token and verifies that the username matches the user credential.

* * * * *